United States Patent
Park

(10) Patent No.: US 7,254,410 B2
(45) Date of Patent: Aug. 7, 2007

(54) SHORT MESSAGE RECEPTION METHOD FOR MOBILE COMMUNICATION TERMINAL

(75) Inventor: Won Hyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 493 days.

(21) Appl. No.: 10/160,164

(22) Filed: Jun. 4, 2002

(65) Prior Publication Data

US 2002/0193128 A1    Dec. 19, 2002

(30) Foreign Application Priority Data

Jun. 13, 2001    (KR)    ............ 10-2001-33220

(51) Int. Cl.
*H04Q 7/20* (2006.01)
*H04Q 7/22* (2006.01)
*H04L 12/58* (2006.01)
*H04M 1/725* (2006.01)

(52) U.S. Cl. .................... 455/466; 455/412.1
(58) Field of Classification Search ............ 455/412.2, 455/466, 456.1, 412.1, 558, 417; 709/206; 379/88.27
See application file for complete search history.

(56) References Cited

U.S. PATENT DOCUMENTS

| | | | |
|---|---|---|---|
| 5,687,216 A * | 11/1997 | Svensson ............ 455/466 |
| 6,393,296 B1 * | 5/2002 | Sabnani et al. ............ 455/466 |
| 6,483,899 B2 * | 11/2002 | Agraharam et al. ..... 379/88.14 |
| 6,628,936 B1 * | 9/2003 | Furuya .................... 455/412.1 |
| 6,665,531 B1 * | 12/2003 | Soderbacka et al. ....... 340/7.21 |
| 6,697,458 B1 * | 2/2004 | Kunjibettu ............... 379/88.17 |
| 2002/0137530 A1 * | 9/2002 | Karve ........................ 455/466 |
| 2003/0119532 A1 * | 6/2003 | Hatch ........................ 455/466 |

FOREIGN PATENT DOCUMENTS

| | | |
|---|---|---|
| JP | 8-505747 | 6/1996 |
| JP | 10-243455 | 11/1998 |
| JP | 2000-244555 | 8/2000 |

* cited by examiner

*Primary Examiner*—William Trost
*Assistant Examiner*—Marivelisse Santiago-Cordero
(74) *Attorney, Agent, or Firm*—KED & Associates, LLP

(57) ABSTRACT

A method for managing short messages in a mobile communications terminal transmits either a previously stored message or a newly received message to an e-mail address when a memory of the terminal is saturated. The method includes allocating the terminal memory to have a basic capacity portion and a reserve capacity portion, determining whether a newly received message can be stored in the basic capacity portion, and storing the newly received message in the reserve capacity portion when the basic capacity portion is saturated. If at least one message stored in the basic capacity portion has an "unread message" status, then that unread message is transmitted to the e-mail address to make room for storage of the newly received message. This method therefore ensures that no previously stored "unread" or "stored" message is overwritten with a new message when the terminal memory is filled to capacity.

24 Claims, 3 Drawing Sheets

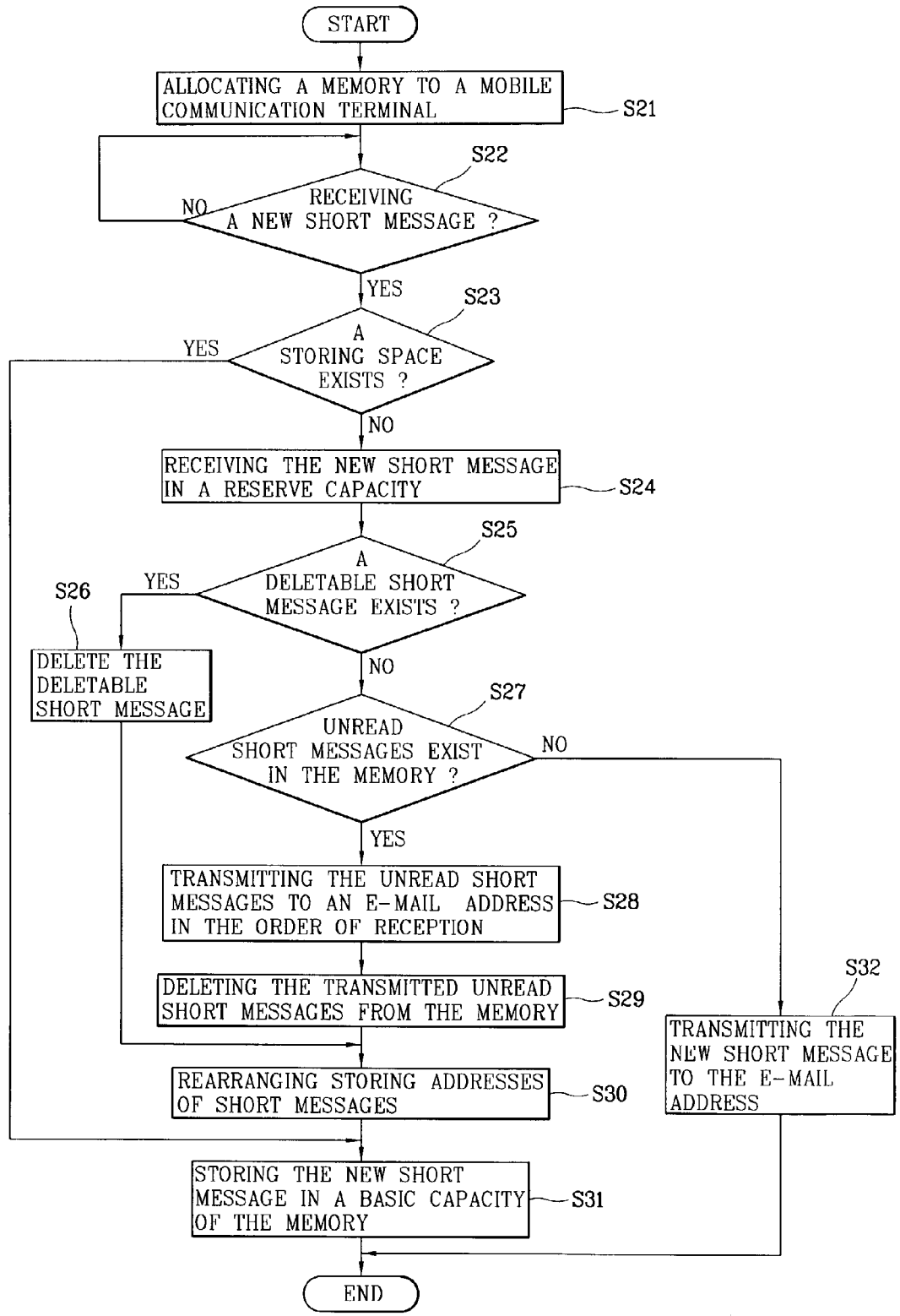

SHORT MESSAGE RECEPTION METHOD FOR MOBILE COMMUNICATION TERMINAL

BACKGROUND OF THE INVENTION

1. Field of the Invention

The present invention relates to a method for receiving a short message in a mobile communication terminal, and in particular to a short message reception method for a mobile communication terminal which is capable of receiving SMS (short message service) data greater than a capacity of a memory of a mobile communication terminal.

2. Background of the Related Art

Recently, SMS (short message service) subscribers have increased in proportion to a rapid spread of mobile communication terminals. Unlike an e-mail service, in the SMS, information can be transmitted to a mobile communication terminal of the other party almost at the same time as a dispatch time. This fast communication rate has consolidated the position of SMS as one of the main communication services.

The SMS can exchange a short message of about 40 letters through mobile communication terminals of subscribers. If a mobile communication terminal is turned off or a pertinent mobile communication terminal is in a no-service area, a received short message is stored for a certain time until the pertinent mobile communication terminal returns to a service area. Accordingly, when a message is short or a voice communication is impossible, it is efficient to use the SMS (short message service). Also, because the short message service charge is cheaper than a voice communication charge, usage of the short message service has gradually increased. Particularly, a credit card company has introduced a service reporting transaction approval information to a customer by using a short message service in order to prevent card misuse. In addition, the SMS (short message service) has been applied to an electronic approval and an electronic commerce.

At least one drawback exists in conventional SMS systems. Specifically, there is a limitation in the capacity of a memory allocated to a terminal for a SMS. As a result, when a message over the memory capacity is received, formerly received messages are orderly deleted or a new message can not be received. More specifically, in the conventional mobile communication terminal, a storing capacity for SMS data is preset and SMS messages can be received only within the set storing capacity.

FIG. 1 is a flow chart illustrating the conventional SMS reception method of a mobile communication terminal. The method begins by allocating storage space for storing short messages in the memory of the conventional mobile communication terminal, as shown at step S11. Next, it is sensed whether a short message has been transmitted from a base station, as shown at step S12. When a short message is sensed, a pertinent mobile communication terminal judges whether there is a reserve space for storing the short message in the allocated memory as shown at step S13. When there is reserve space for storing the short message, the mobile communication terminal allocates the reserve space for storing the short message, as shown at step S14, and the short message is stored in the reserve space, as shown at step S15.

When there is no reserve space for storing the short message, the mobile communication terminal can not receive the short message as shown at step S16. A system of the base station periodically transmits the short message to the mobile communication terminal, but when a certain time set in the system has passed, as shown at step S17, the system finishes the short message transmission as shown at step S18.

The short message reception method of the conventional mobile communication system will be described in detail. First, a mobile communication terminal has a certain capacity of memory space for storing short messages. More specifically, if a maximum memory capacity for storing one short message is 50 bytes, the mobile communication terminal has a memory capacity of 5 kbytes for receiving 100 short messages. If a 101st short message is transmitted to the mobile communication terminal, the 5-kbyte memory capacity is exceeded, and accordingly the 101st short message can not be received.

The base station system periodically transmits the reception-rejected short message to the mobile communication terminal. However, the 101st short message cannot be received unless a user deletes a short message pre-received in the mobile communication terminal. At that state, when a certain time has passed, the base station system stops transmitting the 101st short message.

This conventional method therefore has significant drawbacks. As described above, in order to receive a short message in the conventional mobile communication terminal, there always has to be a reserve memory space of a mobile communication terminal. In more detail, when a memory of a mobile communication terminal for storing short messages is fully filled with received short messages, the terminal can not receive more short messages. Accordingly, a user has to check and manually delete received short message at a certain time interval in order to secure a reserve space of the memory.

SUMMARY OF THE INVENTION

An object of the invention is to solve at least the above problems and/or disadvantages and to provide at least the advantages described hereinafter.

Accordingly, an object of the present invention is to provide a short message reception method for a mobile communication terminal which receives SMS (short message service) data which is greater than a memory capacity of the mobile communication terminal.

In order to achieve the above-mentioned object, in a mobile communication terminal having a certain capacity of memory for storing short messages, one embodiment of a short message reception method for a mobile communication terminal in accordance with the present invention includes automatically transmitting short messages to an e-mail address of a user when the memory capacity of a mobile communication terminal is saturated.

A short message reception method for a mobile communication terminal in accordance with the present invention includes allocating a memory for storing short messages to a mobile communication terminal, securing a memory space by deleting short messages stored in the memory when a quantity of received short messages exceeds a memory capacity, and rearranging the secured memory space and storing the received short messages.

According to one aspect of the present invention, the memory includes a reserve capacity portion capable of receiving a first number of short messages and a basic capacity portion capable of receiving a second number of short messages. Some of the short messages may be deletable short messages, which are ones a user has read and has indicated should not be saved. The deletable short messages may be replaced by new messages in the basic capacity portion.

According to another aspect of the present invention, additional steps may be preformed such as orderly shifting short messages stored in next addresses of the secured memory space; and storing a new short message in a last address secured by shifting one of the short messages.

According to another aspect of the present invention, an additional step may be performed such as automatically transmitting the short messages stored in the memory to an e-mail address set by a user when no deletable short messages exist in the memory.

According to another aspect of the present invention, the previously received short messages include an unread short message (i.e., a message whose content has not been checked by a user) stored in the basic capacity portion of the memory. The newly received short message may be stored in the reserve capacity portion of the memory. In such circumstances, additional steps may be performed, including: transmitting automatically unread short messages to an e-mail address set by a user when no deletable short message exists in the memory; and deleting the short messages transmitted to the e-mail address from the basic capacity portion.

According to another aspect of the present invention, additional steps may be performed such as transmitting automatically a short message newly received to the reserve capacity portion of the memory of the mobile communication terminal to the e-mail address set by the user; and deleting the short message transmitted to the e-mail address from the reserve capacity portion.

In accordance with another embodiment, a short message reception method for a mobile communication terminal in accordance with the present invention includes allocating a terminal memory to include a reserve capacity portion for receiving a certain number of short messages and a basic capacity portion storing a short message received in the reserve capacity portion when the basic capacity portion is saturated, deleting a deletable short message stored in the basic capacity portion, orderly shifting short messages stored in next addresses of the deleted short messages to fill storage addresses of the deleted short message, and storing the short message stored in the reserve capacity portion in the last address of the basic capacity portion.

According to another aspect of the invention, the reserve capacity portion is either appended to the basic capacity portion or is allocated within the basic capacity portion. Preferably, the deletable short message is set by a user by finishing a content check without storing it, and deleting in the order of storing when there are a plurality of deletable short messages.

In accordance with another embodiment, a short message reception method for a mobile communication terminal in accordance with the present invention includes allocating a terminal memory to have a basic capacity portion and a reserve capacity portion storing a short message received in the reserve capacity portion when the basic capacity portion is saturated, transmitting unread short messages stored in the basic capacity portion to a set e-mail address, deleting the short messages transmitted to the e-mail address from the basic capacity portion, shifting orderly short messages in next addresses of the deleted short messages to fill storage addresses of the deleted short messages, and storing the short message stored in the reserve capacity portion in the last address of the basic capacity portion.

According to another aspect of the invention, the reserve capacity portion is either appended to the basic capacity portion or is allocated within the basic capacity portion. Preferably, the unread short messages stored in the basic capacity portion of the mobile communication terminal are short messages unchecked by a user, and the unread short messages are transmitted to the e-mail address in the order of storing when a plurality of unread short messages exist.

In accordance with another embodiment, a short message reception method for a mobile communication terminal in accordance with the present invention includes allocating a certain capacity of a memory having a basic capacity and a reserve capacity to a mobile communication terminal, storing a short message received over the basic capacity in the reserve capacity, transmitting the short message stored in the reserve capacity to a set e-mail address, and deleting the short message transmitted to the e-mail address from the reserve capacity.

A short message reception method for a mobile communication terminal in accordance with the present invention includes allocating a memory having a basic capacity and a reserve capacity to a mobile communication terminal, judging whether a new received short message can be stored in the basic capacity, storing the new received short message in the reserve capacity when the basic capacity is saturated, judging whether a deletable short message exists in the basic capacity of the memory, checking whether an unread message exists when there is no deletable short message, transmitting the unread short message to an e-mail address set by a user when the unread short message exists, and deleting the short message transmitted to the e-mail address from the memory, rearranging storing addresses of the short messages and storing the short messages stored in the reserve capacity in the last address of the basic capacity.

Preferably, a deletable short message is deleted when there is the deletable short message, rearranging storing addresses of the rest short messages and storing the short message stored in the reserve capacity in the basic capacity.

More preferably, the short message received in the reserve capacity is transmitted to an e-mail address set by a user and it is deleted from the reserve capacity when a deletable short message and an unread short message do not exist in the basic capacity of the memory.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a flow chart illustrating steps included in an embodiment of a short message reception method for a mobile communication terminal in accordance with the present invention.

DETAILED DESCRIPTION OF PREFERRED EMBODIMENTS

Hereinafter, embodiments of a short message reception method for a mobile communication terminal in accordance with the present invention will be described with reference to accompanying drawings.

Figure 1:
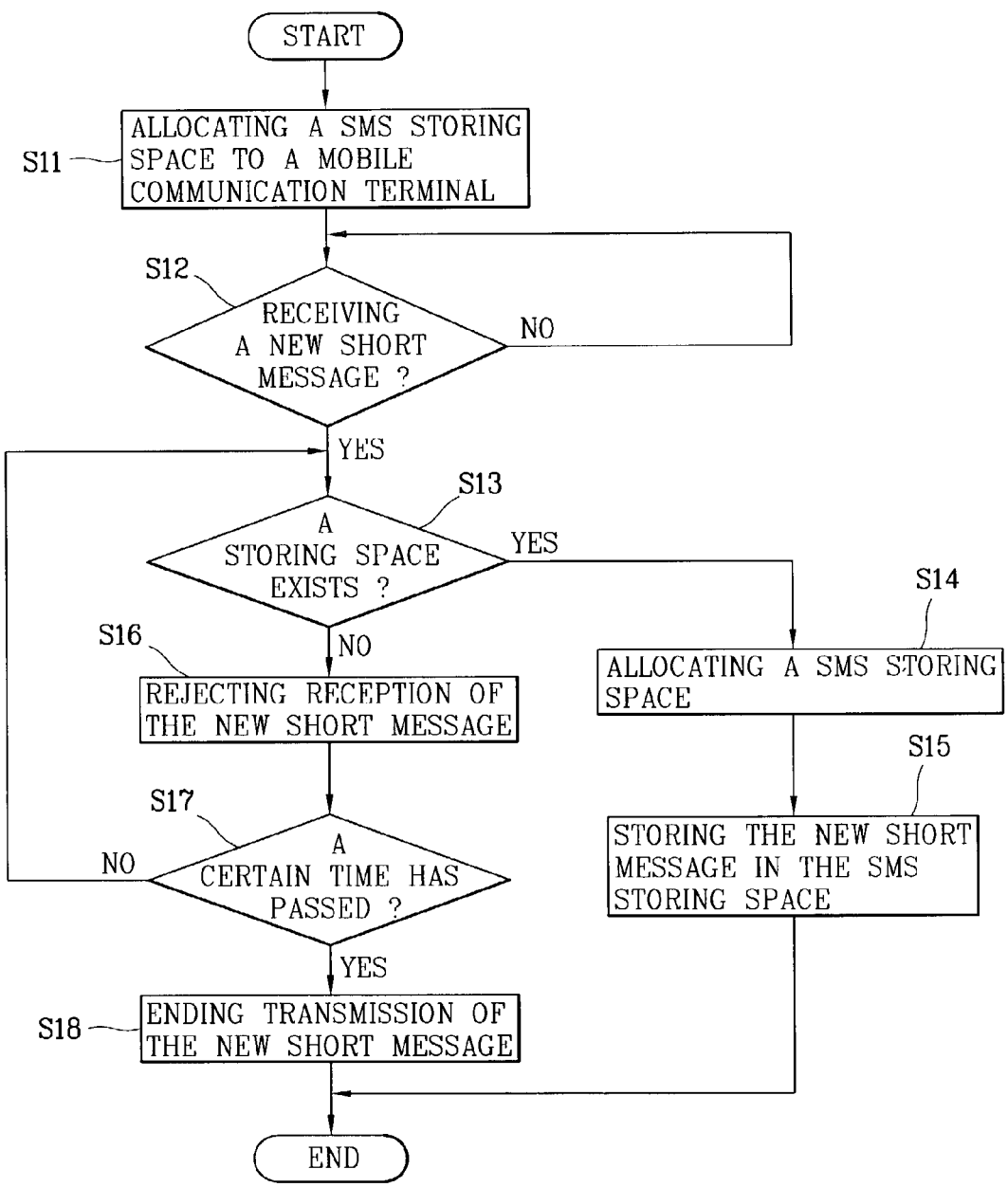
FIG. 1 is a flow chart illustrating the conventional SMS reception method for a mobile communication terminal.
Figure 2:
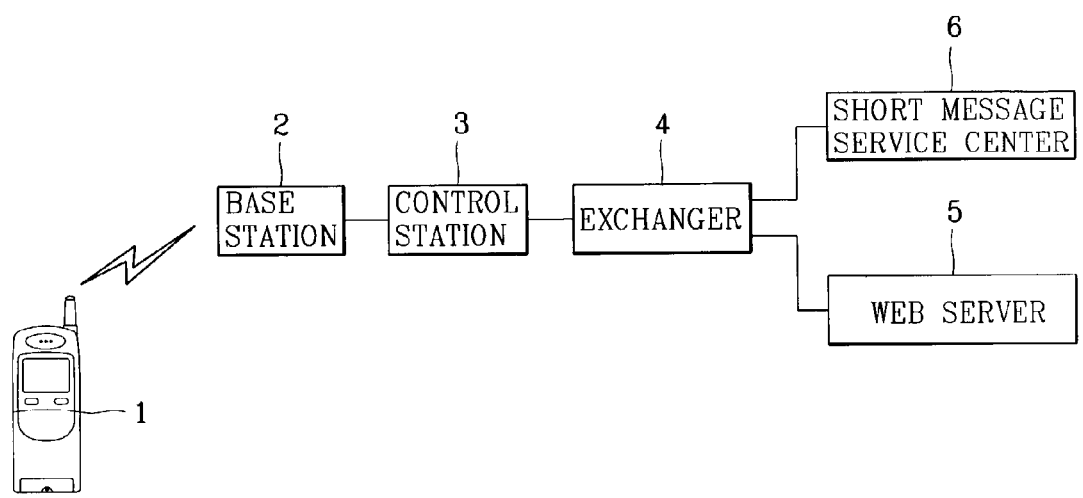
FIG. 2 is a block diagram illustrating a structure of a mobile communication system in accordance with an embodiment of the present invention.

FIG. 2 is a block diagram illustrating a structure of a mobile communication system in accordance with the present invention. As depicted, a mobile communication system in accordance with the present invention includes a mobile communication terminal 1 providing a personal communication service such as a short message service, a base station 2 transmitting/receiving messages and state information with the mobile communication terminal 1, and a control station 3 controlling and managing a plurality of base stations 2, controlling a wire/wireless link in call originating/call receiving processing and performing functions required for wireless call processing such as a transcoding, a hand off control, etc. The system also includes an exchanger 4 performing a switch function by linking the control station 3 with other stations and other networks, and for performing functions required for calling processing and data exchange of a mobile communication system. A short message center 6 provides a short message service between the mobile communication terminal 1 and the exchanger 4 or an external device and the exchanger 4, and a web server 5 transmits an e-mail transmitted from the mobile communication terminal 1 to an e-mail server (not shown) of a user through an Internet communication network.

The mobile communication terminal 1 includes a memory having a certain capacity for storing short messages and a user e-mail address for receiving short messages which exceed the memory capacity. Herein, when the mobile communication terminal 1 receives short messages which exceed the memory capacity, pre-received short messages are automatically orderly transmitted to the e-mail address of the user.

The short messages can be classified into three kinds.

First, a short message unchecked by the user is "unread SMS," a short message checked and stored by the user is "stored SMS," and a short message omitted a storing step after being checked by the user is "deletable SMS."

Herein, when the user pushes a "storing" button of the mobile communication terminal after checking contents of a received short message, a pertinent short message is a "stored SMS." When the user proceeds to a next short message without pushing the "storing" button or finishes checking the short message after reading the pertinent short message, the pertinent short message is a "deletable SMS" automatically deletable in order to secure the memory capacity when there is no reserve space of the memory. In greater detail, after being checked by the user, a short message is divided into "stored SMS" and "deletable SMS" based on whether the user pressed the "storing" button.

FIG. 3 is a flow chart illustrating a short message reception method for a mobile communication terminal in accordance with one embodiment of the present invention. First, the mobile communication terminal allocates a certain capacity of memory for storing short messages as shown at step S21. The memory includes a reserve capacity for storing a certain number of short messages as well as a basic capacity for storing a certain number of short messages. The reserve capacity is for temporarily storing newly received short messages after the basic capacity of the memory is fully filled with pre-received short messages. For example, the mobile communication terminal may allocate a reserve capacity of 50 byte per one short message, in addition to a basic capacity of 5 kbyte for receiving 100 short messages respectively having a maximum size of 50 byte. In that case, the memory capacity for short message reception is 5050 bytes, and accordingly the total of 101 short messages can be received. When an allocation capacity for short message reception is fixed as 5 kbyte, a capacity for receiving 99 short messages is set as a basic capacity, and a capacity for receiving 1 short message can be allocated as a reserve capacity.

When the mobile communication terminal receives a new short message as shown at step S22, it is checked whether an allocated basic capacity of a memory is saturated by pre-received short messages as shown at step S23. If there is a space for storing the new short message in the basic capacity, a pertinent short message is stored in the basic capacity as shown at step S31. If the basic capacity of the memory is saturated by pre-received messages, the mobile communication terminal receives the pertinent short message in the reserve capacity as shown at step S24.

Next, the mobile communication terminal checks whether there is a deletable SMS in order to secure a memory space of the basic capacity as shown at step S25. When there is a deletable SMS, the deletable SMS is deleted in the order of reception as shown at step S26. However, when there is no deletable SMS in the basic capacity of the mobile communication terminal, it is checked whether an unread SMS exists in the basic capacity of the mobile communication terminal as shown at step S27.

When there are unread SMSs in the basic capacity of the mobile communication terminal, the unread SMSs are transmitted to an e-mail address set by a user in the order of reception as shown at step S28. The unread SMSs transmitted to the e-mail address are then deleted from the basic capacity of the mobile communication terminal as shown at step S29.

By orderly shifting next short messages to the memory space of the deleted unread SMSs, storing addresses of short messages stored in the basic capacity are rearranged as shown at step S30, and the short message stored in the reserve capacity is stored in the last address of the basic capacity S31.

As described above, when the mobile communication terminal receives a new short message when the basic capacity is completely filled, each unread SMS is transmitted to the e-mail address and deleted from the basic capacity, accordingly a new short message can be received. However, when an unread SMS does not exist, the new short message received over the basic capacity is transmitted to the e-mail address set by the user as shown at step S32.

As described above, in the short message reception method for the mobile communication terminal in accordance with the present invention, when the basic capacity is saturated by pre-received short messages and a new short message is received, the new short message is stored in the reserve capacity, or a deletable SMS is deleted, or an unread SMS or the new short message is transmitted to the e-mail address of the user. Accordingly, a number of short messages which exceeds the memory capacity of the mobile communication terminal can be received. These steps will now be described in more detail.

In the exemplary case where a basic capacity storing 100 short messages and a reserve capacity storing 1 short message are allocated to a memory of a mobile communication terminal. Among 101 storage addresses realized by this configuration, a last storage address may be allocated to the reserve capacity. Further, assume that if the basic capacity is saturated by 100 pre-received short messages, the 2nd, 5th and 10th short messages are deletable short messages, the $91^{st}$ through $100^{th}$ short messages are unread short messages, and the remaining short messages are stored short messages.

Within this configuration, when a $101^{st}$ short message is received by the mobile communication terminal, the $101^{st}$ message is stored in the reserve capacity of the memory in a $101^{st}$ storage address. In accordance with the invention, the mobile communication terminal deletes the $2^{nd}$ short message as the deletable short message. Accordingly, a space at which the $2^{nd}$ short message was placed is empty, the short messages stored after the $2^{nd}$ short message are respectively shifted to an advanced address by 1. Accordingly, the $101^{st}$ message is stored in a $100^{th}$ storage address (now, it is a $100^{th}$ short message), and the reserve capacity is emptied for receiving new SMS messages.

When $102^{nd}$ and $103^{rd}$ short messages are received by the mobile communication terminal, as described above, the $5^{th}$ and the $10^{th}$ short messages as deletable short messages are orderly deleted. The remaining short messages are then shifted to new storage addresses. Accordingly, 100 short messages are stored in the basic capacity, e.g., the $102^{nd}$ and $103^{rd}$ short messages are stored in the $99^{th}$ and $100^{th}$ storage addresses after shifting takes place.

However, when a $104^{th}$ short message is received by the mobile communication terminal, the $104^{th}$ short message is stored in the reserve capacity of the memory, and the $91^{st}$ short message as the unread SMS is transmitted to the e-mail address set by the user. After the $91^{st}$ short message is transmitted to the e-mail, it is deleted from the memory. Accordingly, a space at which the $91^{st}$ short message is stored is empty, the short messages stored after the storing address number 92 are shifted, and the short message stored in the $101^{st}$ storage address is shifted to a $100^{th}$ storage address.

In even greater detail, if a new short message is received after 100 short messages are stored in the memory of the mobile communication terminal, when a deletable short message exists, the deletable short message is deleted. When a deletable short message does not exist and unread short messages exist, a same number of unread short messages as the number of newly received short messages are orderly transmitted to the e-mail address set by the user. And, when neither a deletable SMS and an unread SMS exists, a short message received over the basic capacity is transmitted to the e-mail address set by the user.

Accordingly, in a short message reception method for a mobile communication terminal in accordance with the present invention, when short messages which exceed a memory capacity of a mobile communication terminal are received, they are transmitted to an e-mail address set by a user. Accordingly, it is possible to receive short messages greater than an allocated memory capacity. In addition, in a short message reception method for a mobile communication terminal in accordance with the present invention, an unread short message is transmitted to an e-mail address set by a user. Accordingly, the user can check the unread short message with a terminal accessible to the Internet.

As the present invention may be embodied in several forms without departing from the spirit or essential characteristics thereof, it should also be understood that the above-described embodiments should not be limited by any of the details of the foregoing description, unless otherwise specified. Rather, the embodiments should be construed broadly within the spirit and scope of the invention as defined in the appended claims. Therefore, all changes and modifications that fall within the metes and bounds of the claims, or equivalence of such metes and bounds, are intended to be embraced by the appended claims. For example, while the present invention has heretofore been described as managing short messages in a mobile communications terminal, those skilled in the art can appreciate that the invention may manage messages other than short messages.

What is claimed is:

1. A short message reception method for a mobile communication terminal, comprising:
    allocating a basic capacity memory space for a mobile communication terminal for storing previously received short messages;
    allocating a reserve capacity memory space for the terminal for storing a newly received short message; and
    automatically transmitting the newly received short message stored in the reserve capacity memory to an e-mail address set by a user when storing the newly received short message in the basic memory space would cause a capacity of the basic capacity memory space to be exceeded, wherein the short messages stored in the basic capacity memory space do not include deletable short messages, which obtain that status after a user checks contents of them.

2. A short message reception method for a mobile communication terminal, comprising:
    allocating a basic capacity memory space for a mobile communication terminal for storing previously received short messages;
    allocating a reserve capacity memory space for the terminal for storing a newly received short message; and
    automatically transmitting one or more short messages stored in the basic capacity memory space to an e-mail address set by the user when no deletable short message exists in the basic capacity memory space.

3. The short message reception method according to claim 2, wherein said one or more short messages include an unread short message at which the user does not check its content and which was pre-received in the basic capacity memory space, and wherein the newly received short message stored in the reserve capacity memory space for the terminal is transferred for storage into the basic capacity memory space.

4. The short message reception method according to claim 2, wherein the automatic transmitting for the one more short messages includes:
    automatically transmitting unread short messages in the basic capacity memory space to the e-mail address set by the user when there is no deletable short message in the basic memory space; and
    deleting the short messages transmitted to the e-mail address from the basic memory space.

5. The short message reception method according to claim 2, further comprising:
    deleting the one or more short messages transmitted to the e-mail address from the reserve capacity memory space.

6. The short message reception method of claim 2, wherein the one or more short transmitted messages are unread messages.

7. The short message reception method of claim 6, further comprising:
    deleting the one or more transmitted short messages;
    shifting remaining short messages in the basic capacity memory space; and
    transferring the newly received short message stored in the reserve capacity memory space for storage in the basic capacity memory space.

8. A short message reception method for a mobile communication terminal, comprising:
providing a first memory and a second memory for storing one or more short messages in the mobile communication terminal;
automatically storing a newly received short message in the second memory and the first memory contains short messages including one or more read messages;
deleting a deletable short message stored in the first memory when the first memory is saturated, and the deletable short message corresponds to a previously checked message having a status resulting from non-activation of a storing button of the mobile communication terminal;
orderly shifting short messages stored in the first memory which follow of the deleted short message to allow the newly received short message to be stored therein; and
automatically storing the newly received short message of the second memory into the first memory.

9. The short message reception method according to claim 8, wherein the reserve capacity portion is either appended to the basic capacity portion or is allocated within the basic capacity portion.

10. The short message reception method according to claim 8, wherein the deletable short message is deleted in an order of storing when there are a plurality of deletable short messages.

11. A short message reception method for a mobile communication terminal, comprising:
allocating a memory for the mobile communications terminal to have a basic capacity portion and a reserve capacity portion;
storing a newly received short message in the reserve capacity portion when the basic capacity portion is saturated;
transmitting at least one unread short message stored in the basic capacity portion to a set e-mail address;
deleting the at least one unread short message transmitted to the e-mail address from the basic capacity portion;
orderly shifting short messages in addresses which follow the address of the at least one deleted short message to fill the storage address of the deleted short messages and
storing the newly received short message stored in the reserve capacity portion in a last address of the basic capacity portion.

12. The short message reception method according to claim 11, wherein the reserve capacity portion is either appended to the basic capacity portion or allocated within the basic capacity portion.

13. The short message reception method according to claim 11, wherein the unread short messages stored in the basic capacity portion for the mobile communication terminal is a short message unchecked by a user.

14. The short message reception method according to claim 11, wherein the transmitting step includes transmitting the unread short message to the e-mail address in an order of storing when a plurality of unread short messages exist.

15. A short message reception method for a mobile communication terminal, comprising:
allocating a memory for the mobile communication terminal to have a basic capacity portion and a reserve capacity portion;
storing a newly received short message in the reserve capacity portion when the basic capacity portion is saturated;
transmitting the newly received short message stored in the reserve capacity portion to a set e-mail address; and
deleting the newly received short message transmitted to the e-mail address from the reserve capacity portion.

16. A short message reception method for a mobile communication terminal, comprising:
allocating a memory for the mobile communication terminal to have a basic capacity portion and a reserve capacity portion;
judging whether a newly received short message can be stored in the basic capacity portion;
storing the newly received short message in the reserve capacity portion when the basic capacity portion is saturated;
judging whether a deletable short message exists in the basic capacity portion of the memory;
checking whether an unread message exists when no deletable short message exists in the basic capacity portion;
transmitting the unread short message to an e-mail address set by a user when the unread short message exists; and
deleting the unread short message transmitted to the e-mail address from the memory, rearranging storage addresses of the short messages stored in the basic capacity portion, and storing the newly received short message stored in the reserve capacity portion in a last address of the basic capacity portion.

17. The short message reception method according to claim 16, wherein if a deletable short message exists in the basic capacity portion, then performing steps of deleting the deletable short message, rearranging storage addresses of remaining short messages, and storing the newly received short message stored in the reserve capacity portion in the basic capacity portion.

18. The short message reception method according to claim 16, wherein the newly received short message stored in the reserve capacity portion is transmitted to the e-mail address set by a user, and deleting the newly received short message from the reserve capacity portion when a deletable short message and an unread short message do not exist in the basic capacity portion of the memory.

19. A method for managing messages in a mobile communications terminal, comprising:
storing previously received short messages in a basic capacity memory space for the mobile terminal;
receiving and storing a new short message in a reserve capacity memory space for the mobile terminal; and
automatically transmitting the new short message stored in the reserve capacity memory space to an e-mail address when a threshold of the basic capacity memory space for the mobile terminal is reached, wherein the short messages stored in the basic capacity memory space do not include deletable short messages, which obtain that status after a user checks contents of them.

20. A method for managing messages in a mobile communications terminal, comprising:
storing previously received short messages in a basic capacity memory space for the mobile terminal;
receiving and storing a new short message in a reserve capacity memory space for the mobile terminal; and
automatically transmitting either one of the previously received short messages stored in the basic capacity memory space or the new short message stored in the reserve capacity memory space to an e-mail address when a threshold of the basic capacity memory space for the mobile terminal is reached, wherein said transmitting includes:

transmitting said one of the previously received messages stored in the basic capacity memory space to the e-mail address if said one of the previously received messages is an unread SMS;

deleting said one of the previously received messages from the basic capacity memory space for the mobile terminal; and transferring the new message from the reserve capacity memory space for the mobile terminal for storage in the basic capacity memory space.

21. The method according to claim 20, further comprising:

accessing the e-mail address using the mobile terminal; and checking the unread SMS transmitted to the e-mail address.

22. A method for managing messages in a mobile communications terminal, comprising:

storing previously received short messages in a basic capacity memory space for the mobile terminal;

receiving and storing a new short message in a reserve capacity memory space for the mobile terminal; and automatically transmitting either one of the previously received short messages stored in the basic capacity memory space or the new short message stored in the reserve capacity memory space to an e-mail address when a threshold of the basic capacity memory space for the mobile terminal is reached, wherein the transmitting step includes: transmitting the new message to the e-mail address if all of the previously received messages are read SMSs.

23. A method for managing messages in a mobile communications terminal, comprising:

storing previously received short messages in a basic capacity memory space for the mobile terminal;

receiving and storing a new short message in a reserve capacity memory space for the mobile terminal; and automatically transmitting either one of the previously received short messages stored in the basic capacity memory space or the new short message stored in the reserve capacity memory space to an e-mail address when a threshold of the basic capacity memory space for the mobile terminal is reached, wherein the transmitting step includes:

determining whether said one of the previously received messages stored in the basic capacity memory space is a deletable SMS;

if so, deleting said one of the previously received messages and storing the new message in the basic capacity memory space for the mobile terminal, and if not, then performing one of the following:

(a) transmitting the new message to the e-mail address if said one of the previously received messages is a read SMS, or (b) storing the new message in the basic capacity memory space of the mobile terminal if said one of the previously received messages is an unread SMS message, said storing in (b) being performed after said one of the previously received messages is transmitted to the e-mail address and deleted from the basic capacity memory space for the mobile terminal.

24. A short message reception method for a mobile communication terminal, comprising:

allocating a basic capacity memory space for a mobile communication terminal for storing previously received short messages;

allocating a reserve capacity memory space for the terminal for storing a newly received short message;

determining whether an unread short message or a deletable short message is stored in the basic capacity memory space, and automatically transmitting the newly received short message stored in the reserve capacity memory to an e-mail address set by a user when storing the newly received short message in the basic memory space would cause a capacity of the basic capacity memory space to be exceeded and when no unread short messages and no deletable short messages are stored in the basic capacity memory space.

* * * * *